(12) United States Patent
Maria Klaassen

(10) Patent No.: US 6,234,891 B1
(45) Date of Patent: May 22, 2001

(54) COLLATING CONVEYOR FOR SAUSAGE LINKS

(75) Inventor: Lambertus Gerardus Maria Klaassen, Michielsgestel (NL)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/410,608

(22) Filed: Oct. 1, 1999

(51) Int. Cl.[7] .............................. B65B 5/06; B65B 35/44
(52) U.S. Cl. ........................... 452/182; 452/179; 452/51; 198/418.6
(58) Field of Search ................................. 452/182, 179, 452/180, 51; 198/418, 418.6

(56) References Cited

U.S. PATENT DOCUMENTS

| | | |
|---|---|---|
| 3,846,959 | 11/1974 | Good . |
| 4,031,999 | 6/1977 | Wagner et al. . |
| 4,173,107 | 11/1979 | Wilson . |
| 4,386,490 | 6/1983 | Griffith et al. . |
| 4,733,518 | 3/1988 | Griesdorn . |
| 4,931,131 | 6/1990 | Thompon . |
| 4,979,267 | * 12/1990 | Burger et al. ........................ 452/179 |
| 5,057,055 | * 10/1991 | Michaud et al. .................... 452/182 |
| 5,354,230 | * 10/1994 | McFarlane et al. ................. 452/182 |

FOREIGN PATENT DOCUMENTS 0 472 334 B1    11/1991   (EP) .

* cited by examiner

Primary Examiner—Willis Little
(74) Attorney, Agent, or Firm—Zarley, McKee, Thomte, Voorhees & Sease

(57) ABSTRACT

A collating conveyor is provided for sausage links. The conveyor includes a frame with opposite ends and chains trained about the opposite ends of the frame. A motor drives the chains in a vertically oriented loop. A plurality of brackets are mounted on the chains in longitudinally spaced positions so as to move with the chains. Each bracket includes a basket pivotally mounted thereon. A cam arm with a cam follower is provided on each bracket and connected to the basket. The cam follower tracks in a cam groove on the frame so as to pivot the baskets from a longitudinal position at the mid point of the conveyor to a lateral position at each end of the conveyor. Sausage links from an encasing machine are deposited into each longitudinally oriented basket, which carries the sausage links around the end of the conveyor for discharge onto a tray in collated, parallel rows.

17 Claims, 5 Drawing Sheets

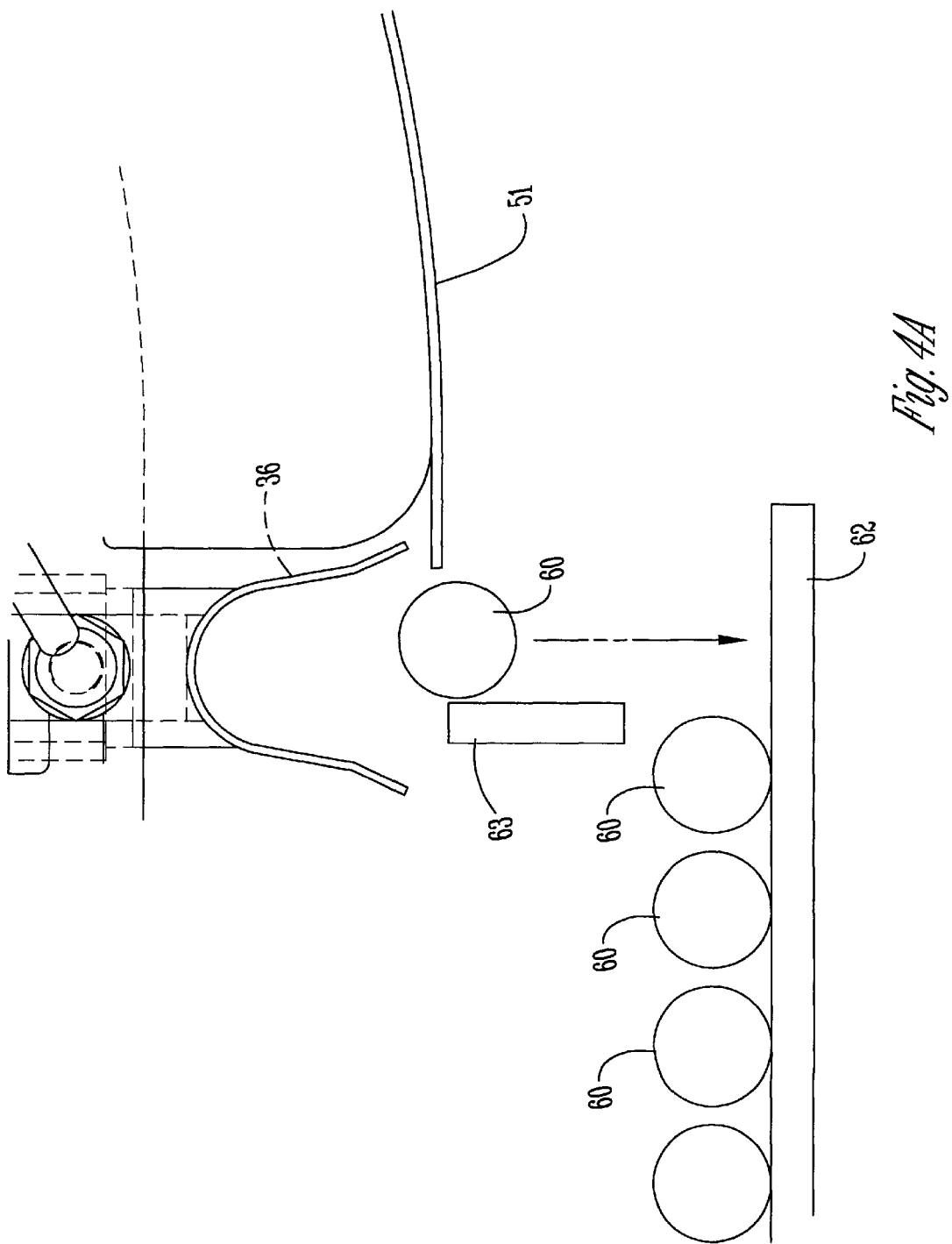

COLLATING CONVEYOR FOR SAUSAGE LINKS

BACKGROUND OF THE INVENTION

Sausage links are conventionally made on a sausage encasing machine wherein a meat emulsion is ejected into shirred casing or is coextruded with an exterior layer such as collagen gel, which forms a casing around the emulsion. The encased emulsion then passes through a linker, which twists or crimps the casing to form a strand of sausage links. The linking station deposits the strand of links onto conveyor hooks which engage the twists or crimps areas between links. The hanging links are then removed from the air conveyor hooks by the insertion of a smoking stick into the loops formed by the hanging links. The hanging orientation of the sausage links on the smoking sticks does not efficiently utilize space, since the hanging links are not closely spaced.

Therefore, a primary objective of the present invention is the provision of a conveying system for sausage links which collates the links in parallel rows.

Anther objective of the present invention is the provision of a sausage link conveyor which deposits the links in closely spaced parallel rows.

A further objective of the present invention is the provision of a method of conveying and collating sausage links cut from a strand of sausages.

These and other objectives will become apparent from the following description of the invention.

SUMMARY OF THE INVENTION

A collating conveyor is provided for sausage links, and includes a frame with opposite ends. A pair of laterally spaced parallel conveyor chains extend around sprockets at each end of the frame and are driven in unison by an electric motor. A plurality of longitudinally spaced brackets are mounted on the chains for movement therewith. A U-shaped basket is pivotally mounted on each bracket. Each bracket also includes a cam arm connected to the basket, with the cam arm being tracked in a cam groove extending along the frame. The cam groove is non-linear such that as the cam arm follows the groove, the basket on the bracket is pivoted from a longitudinal position to a lateral position as the bracket and basket moves along the frame on the chains. The sausage links are deposited into the baskets at an approximate mid point between the ends of the frame while the baskets are longitudinally oriented. As each basket continues moving along the frame, the basket is pivoted by the cam arm to a lateral position. As the basket goes around one end of the frame, the links fall from the basket onto a tray in laterally extending, closely spaced parallel rows such that the links are collated in an organized manner.

BRIEF DESCRIPTION OF THE DRAWINGS

FIG. 4A is an enlarged view taken along lines 4A—4A of FIG. 4.

DETAILED DESCRIPTION OF THE DRAWINGS

Figure 1:
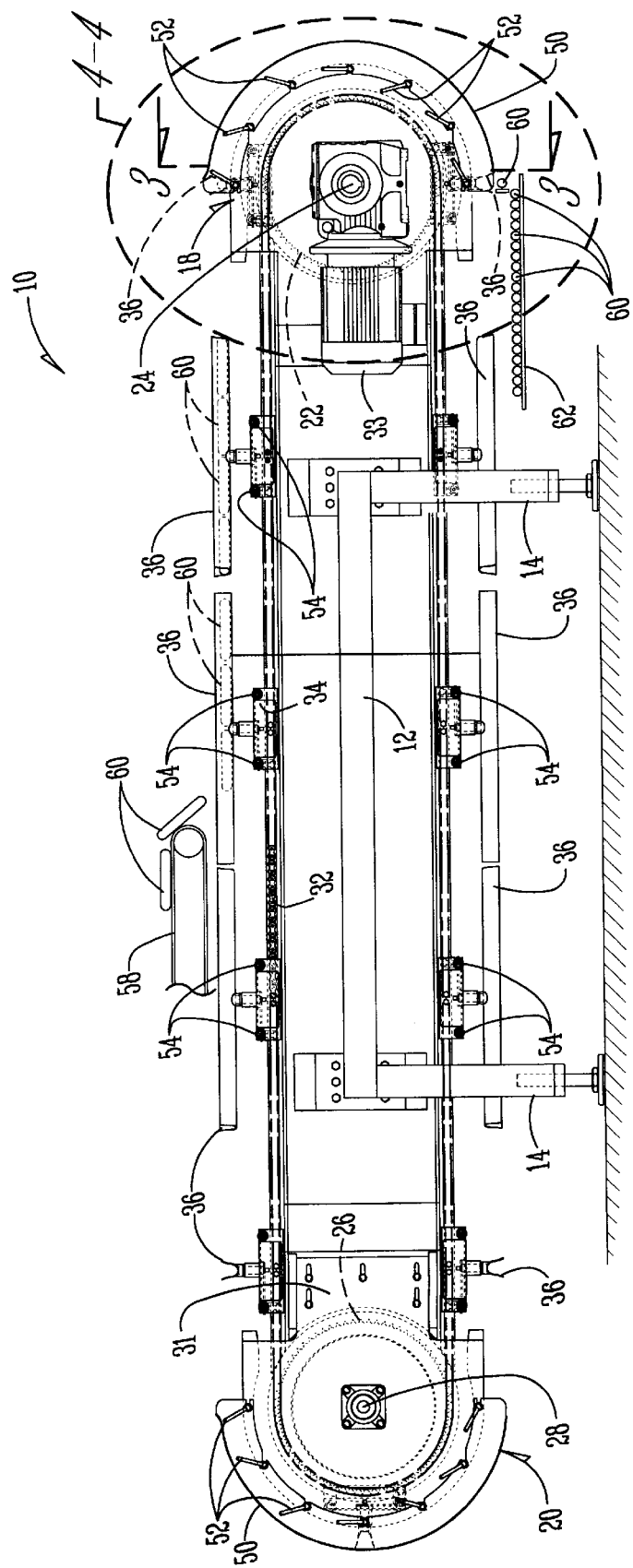
FIG. 1 is a side elevation view of the collating conveyor for sausage links of the present invention.

The collating conveyor of the present invention is generally designated by the reference numeral 10 in the drawings. The conveyor 10 includes a frame 12 with adjustable legs 14. The conveyor 10 includes opposite sidewalls 16 mounted on the frame 12. The conveyor 10 also includes opposite ends 18, 20.

A pair of laterally spaced apart drive sprockets 22 are mounted upon a drive axle 24 at the end 18 of the conveyor 10. A pair of laterally spaced apart idler sprockets 26 are mounted upon an axle 28 at the end 20 of the conveyor 10. A pair of laterally spaced apart chains 30, 32 are trained about the sprockets 22, 26 so as to define a vertically oriented conveyor loop. Preferably, a cylindrical wall or drum 25 extends between the drive sprockets 22. Similarly, a cylindrical drum 29 extends between the idler sprockets 26.

At the second end 20 of the conveyor 10, a pair of lateral end plates 31 allow longitudinal adjustment of the idler sprockets 26, as best seen in FIG. 1.

An electric motor 33 is mounted on the frame 12 and is operatively connected to the drive axle 24 for imparting rotation to the drum 25 and drive sprockets 22, and thus rotating the chains 30, 32, which are trained about the sprockets 22, 26.

A plurality of brackets 34 are mounted in longitudinally spaced relation on the chains 30, 32 and extend laterally between the chains. A U-shaped basket 36 is pivotally secured to each bracket 34.

Figure 2:
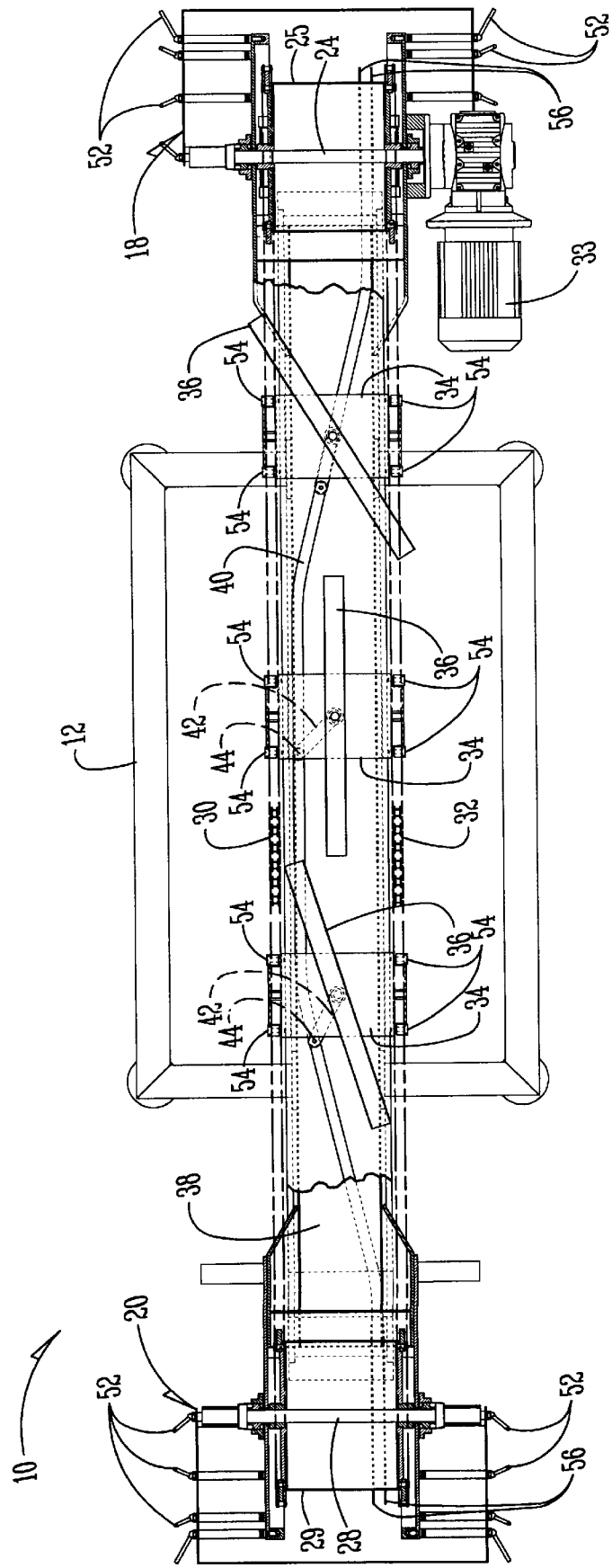
FIG. 2 is a top plan view of the collating conveyor, with portions of each end broken away for clarity.
Figure 3:
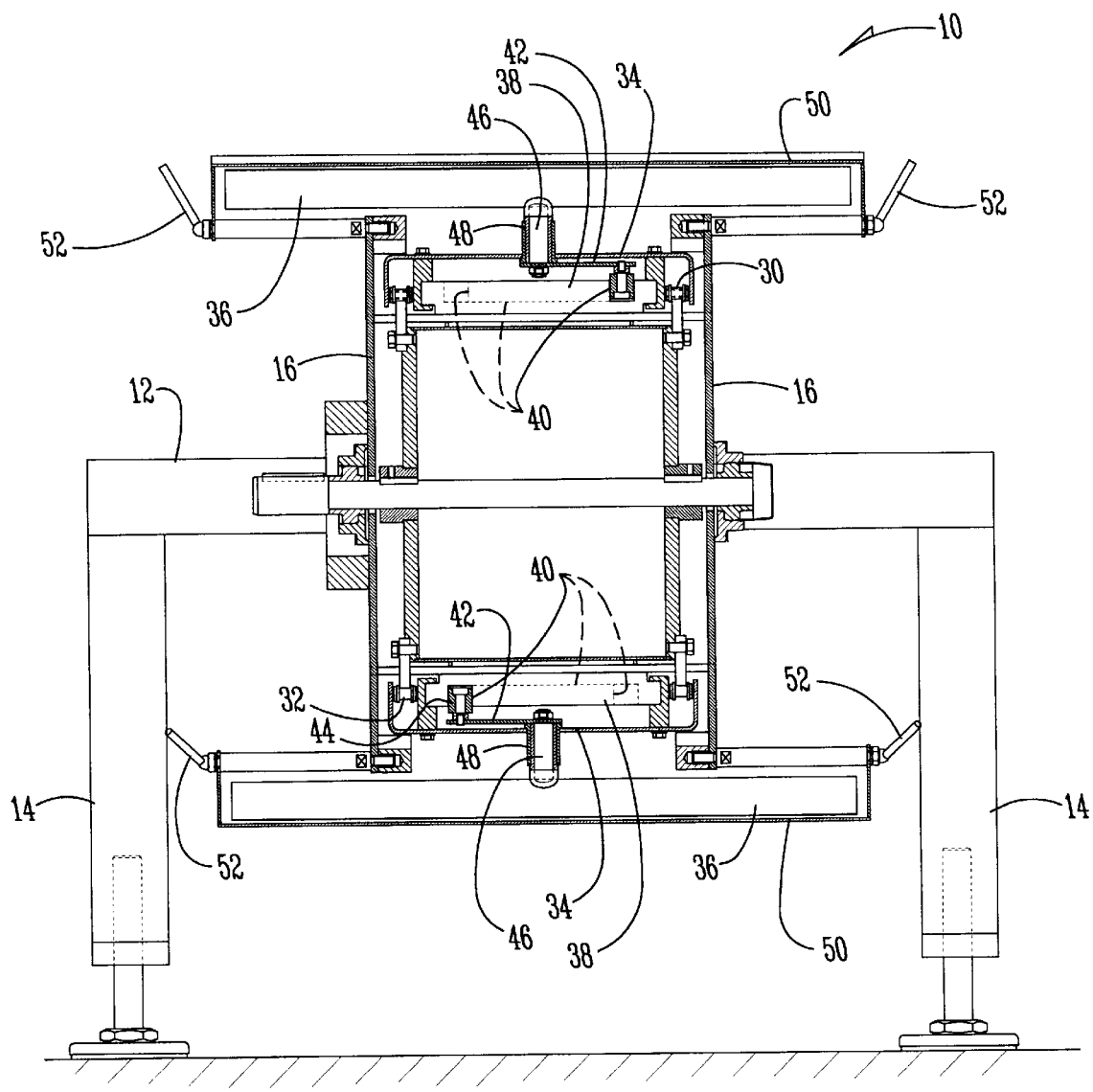
FIG. 3 is a sectional view taken along lines 3—3 of FIG. 1.

Upper and lower cam plates 38 are rigidly secured between the sidewalls 16 of the frame 12. Each cam plate 38 includes a cam slot or groove 40, which extends non-linearly, as best seen in FIG. 2. Each bracket 34 includes a cam arm 42 with a cam follower 44 received in the cam slot 40. As seen in FIG. 3, the cam arm 42 is rigidly connected to the basket 36 by a shaft 46, which is rotatably journaled within a collar 48 on the bracket 34. Thus, as the cam follower 44 tracks along the cam slot 40, the basket moves between a longitudinal orientation at approximately the mid point between the opposite ends 18, 20 of the conveyor 10 and a lateral orientation at the ends of the conveyor 10.

Figure 4:
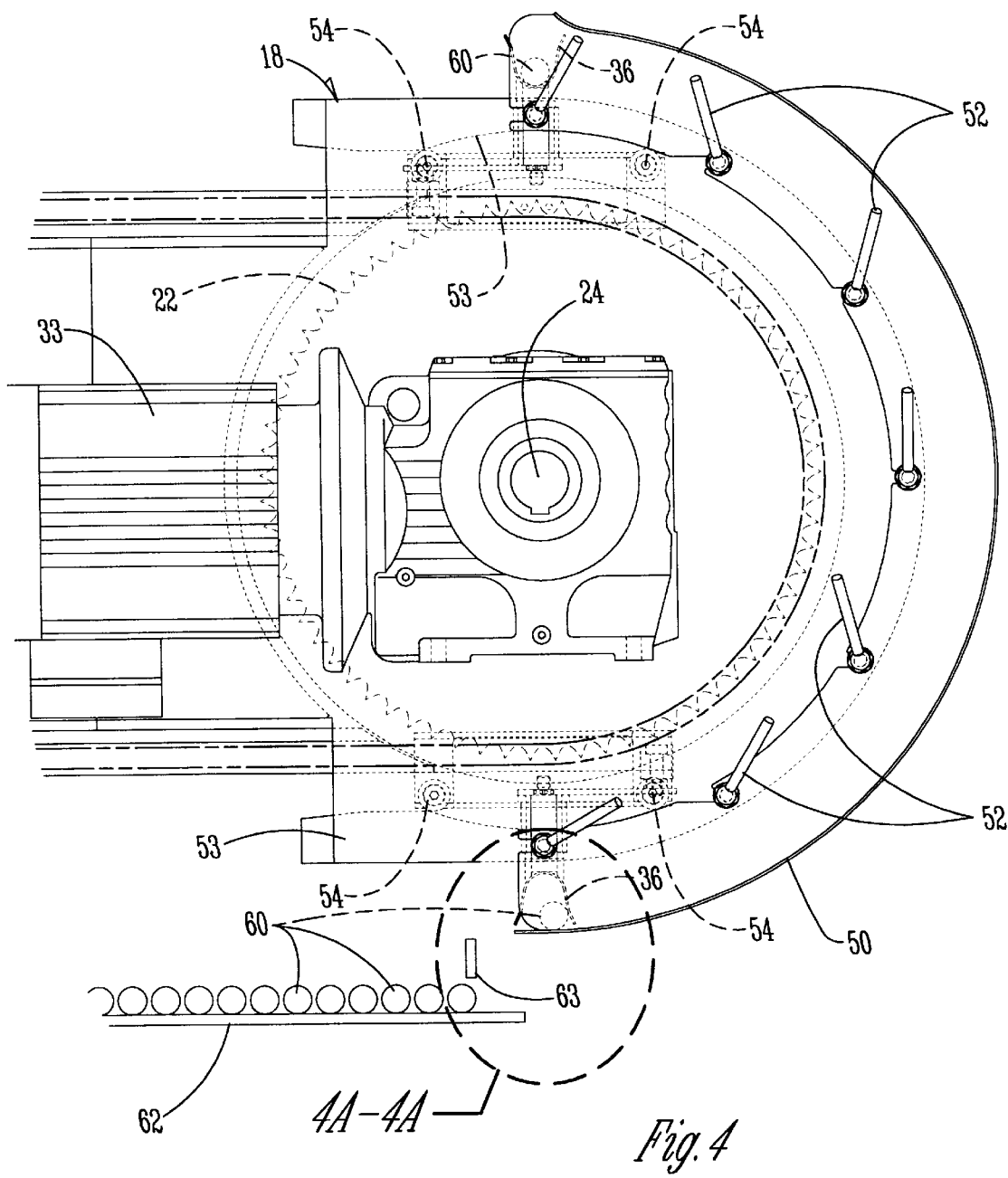
FIG. 4 is an enlarged view taken along lines 4—4 of FIG. 1.

A turnover plate or guide assembly 50 is provided at each end 18, 20 of the conveyor 10. The turnover plate assembly includes a curved plate spaced closely to the baskets 36. The turnover plate assembly 50 is connected to the sidewalls 16 of the frame 12 by a plurality of elongated clamp nuts 52, and terminates in a horizontal flat surface 51. Within the turnover plate assembly 50 is a pair of spaced apart curved rails 53, as best seen in FIG. 4. Each bracket 34 has stabilizer rollers 54 on each corner which are rollable along the rails 53 to stabilize the bracket as it moves around the end 18 of the conveyor 10.

A pair of spaced apart rings 56 are mounted on each sprocket drum 25, 29, as best seen in FIG. 2. The rings 56 define a continuation of the cam slot 40 and receive the cam follower 44 as each bracket 34 moves around each end 18, 20 of the conveyor 10. Thus, the baskets 36 remain in a lateral orientation as the baskets move around the ends 18, 20 of the conveyor 10.

A conveyor 58 delivers sausage links 60 from a sausage encasing machine (not shown). The sausage links 60 have previously been cut from a strand of links. FIG. 1 shows individual sausage links 60 being deposited from the conveyor 58 into the baskets 34. However, it is understood that short strands of sausage links having a length less than the length of the baskets may also be discharged from the conveyor 58 into each basket 34.

In operation, the conveyor 58 carries the sausage links 60, or short strands of sausage links, from the encasing machine to the conveyor 10. The links 60 are deposited from the conveyor 58 onto the longitudinally oriented basket 36 at the approximately mid point of conveyor 10, as best seen in FIG. 1. It is understood that the speed of the conveyor 58 is coordinated with the speed of the conveyor 10 so that the sausage links 60 are properly deposited into the baskets 36. As the chains 30, 32 carry the brackets 34 forwardly, the cam follower 44 tracks in the cam slot 40 of the cam plate 38 so as to pivot the basket 36 to a lateral orientation at the end 18 of the conveyor 10. As the basket 36 moves around the end 18 of the conveyor 10, the turnover plate assembly 50 maintains the sausage links 60 in the basket. As the basket 36 exits the turnover plate assembly 50, the sausage links 60 drop by gravity from the basket 36 onto a tray 62. The horizontal flat surface 51 of the guide assembly 50 eliminates the centrifugal force on the links 60. The sausage links thus have a controlled horizontal velocity equal to the linear speed of the conveyor 10. After leaving this flat surface 51, the sausage drop by gravity onto the tray 62. At an adjustable distance from the edge of the horizontal flat a bar 63 is mounted. The bar 63 lets the sausage links 62 stop at the exact chosen position of tray 62, despite differences in weight which might otherwise cause the links 62 to drop at a different distance from the edge of the guide plate assembly 50.

As successive baskets 36 are moved around the conveyor 10, the sausage links 60 are deposited and collated in parallel lateral rows on the tray 62, as shown in FIGS. 1 and 4. It is understood that the tray 62 is supported and moved in a manner so as to receive the successively discharged links 60, and can be removed when the tray is full.

From the foregoing, it can be seen that the present invention accomplishes at least all of the stated objectives.

What is claimed is:

1. A collating conveyor for sausage links, comprising an elongated frame having first and second ends and a mid-section,
 a pair of laterally spaced parallel continuous conveyor chain sections on the frame and movable in unison in vertical planes and threaded around the first and second ends of the frame, with each chain section having a top and bottom portion;
 a plurality of spaced support brackets on the chain sections and extending laterally therebetween for movement with the chain sections;
 an elongated U-shaped sausage link support basket pivotally secured to each support bracket;
 a cam plate on the frame and in between the top portions of the chain sections;
 a cam arm rigidly secured to each basket and operatively engaging a non-linear cam groove in the cam plate to move each basket from a lateral position to a longitudinal position as the baskets move towards the mid-section of the frame, and the back to the lateral position as the basket moves away from the mid-section;
 a sausage link dispensing assembly on the mid-section of the frame for depositing separate sausage links in end to end relation in the baskets as the baskets pass in a longitudinal direction; and
 a receptacle underneath the frame for receiving laterally extending rows of sausages from the baskets as the baskets pass from the top portion to a bottom portion of the chain sections around the second end of the frame to invert the baskets and to cause the sausages to fall from the baskets by gravity.

2. The apparatus of claim 1 where in a guide is mounted on the frame to retain the sausages in their respective baskets as they move around the second end of- the frame.

3. The apparatus of claim 1 wherein the receptacle is a tray adapted to hold a plurality of parallel rows of sausage links deposited from a plurality of baskets passing thereover.

4. A method of conveying and collating sausage links cut from an elongated sausage strand, comprising, locating a continuous conveyor underneath a sausage link dispensing assembly;
 pivotally connecting a plurality of elongated sausage baskets on the conveyor for receiving lines from the dispensing assembly;
 rotating the conveyor in a vertical plane; and
 maintaining the baskets in a transverse position while moving with the conveyor except moving the baskets to a longitudinal position when they pass under the dispensing assembly.

5. The method of claim 4 further comprising discharging the sausage links from the baskets onto a tray in adjacent parallel rows.

6. The method of claim 4 wherein the baskets are moved between the transverse and longitudinal positions by cam action.

7. The method of claim 4 further comprising moving the baskets to an inverted position to discharge the links by gravity.

8. A conveyor for sausage links, comprising: a frame with opposite first and second ends;
 an endless conveyor assembly trained about the opposite ends of the conveyor so as to travel in a vertically oriented loop; and
 a plurality of baskets connected to the conveyor assembly for movement therewith, the baskets being adapted to receive a strand of sausages between the opposite ends to carry the strand of sausage to the first end for discharge in parallel rows,
 the baskets being rotatably mounted on a vertical axis for rotation in a horizontal plane so as to move from a longitudinal position between the opposite ends for receiving the sausages to a transverse position at the first end for discharging the sausages.

9. The conveyor of claim 8 wherein the frame includes a cam surface and each basket includes a cam arm engaging the cam surface to cause the basket to rotate between the longitudinal and transverse positions.

10. The conveyor of claim 8 wherein the first end includes a cover to retain the sausages in the basket until the basket moves to a 6 o'clock position.

11. The conveyor of claim 8 wherein the conveyor assembly includes a pair of laterally spaced chains to which the baskets are connected in longitudinal spaced relation.

12. A method of conveying sausage links, comprising:

successively loading the links into a plurality of baskets traveling along a conveyor such that the links are linearly disposed in the baskets;

moving the baskets and links to an end of the conveyor for successive discharge into parallel rows; and moving the baskets from a longitudinal orientation relative to the conveyor when the links are loaded to a transverse position when the links are discharged.

13. The method of claim 12 wherein the pivoting of the baskets is achieved by cam action.

14. The method of claim 12 wherein the baskets move in a vertically oriented loop.

15. The method of claim 12 wherein the baskets move around the end of the conveyor so as to be inverted, whereby the links are discharged by gravity.

16. The method of claim 12 wherein the links are discharged onto a tray.

17. The method of claim 16 further comprising moving the tray so as to receive successive rows of links.

\* \* \* \* \*